United States Patent
Giombanco et al.

(10) Patent No.: US 10,673,322 B1
(45) Date of Patent: Jun. 2, 2020

(54) POWER FACTOR CORRECTION ZERO CURRENT DETECTION

(71) Applicant: TEXAS INSTRUMENTS INCORPORATED, Dallas, TX (US)

(72) Inventors: Salvatore Giombanco, Cassaro (IT); Ananthakrishnan Viswanathan, Allen, TX (US); William James Long, Cork (IE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/544,425

(22) Filed: Aug. 19, 2019

Related U.S. Application Data

(60) Provisional application No. 62/793,627, filed on Jan. 17, 2019.

(51) Int. Cl.
*H02M 1/42* (2007.01)
*H02M 1/00* (2006.01)
*H02M 3/335* (2006.01)

(52) U.S. Cl.
CPC ...... *H02M 1/4225* (2013.01); *H02M 3/33569* (2013.01); *H02M 2001/0009* (2013.01); *H02M 2001/0058* (2013.01)

(58) Field of Classification Search
CPC ........... H02M 3/33569; H02M 1/4225; H02M 2001/0058; H02M 2001/0009
See application file for complete search history.

(56) References Cited

U.S. PATENT DOCUMENTS

| | | | |
|---|---|---|---|
| 2018/0191271 A1* | 7/2018 | Giombanco | H02M 1/4241 |
| 2019/0199196 A1* | 6/2019 | Giombanco | H02M 1/083 |
| 2019/0199203 A1* | 6/2019 | Viswanathan | H02M 7/06 |
| 2019/0260289 A1* | 8/2019 | Leisten | H02M 1/32 |

* cited by examiner

*Primary Examiner* — Gary L Laxton
*Assistant Examiner* — Sisay G Tiku
(74) *Attorney, Agent, or Firm* — Mark Allen Valetti; Charles A. Brill; Frank D. Cimino

(57) ABSTRACT

A power factor correction controller zero current detection circuit includes a differentiator circuit, a comparator, a first qualification timer circuit, an idle ringing detector circuit, a second qualification timer circuit, and a flip-flop. The comparator is coupled to the differentiator circuit. The first qualification timer circuit includes an input coupled to an output of the comparator. The idle ringing detector circuit includes a first input coupled to the output of the comparator, and a second input coupled to an output of the first qualification timer circuit. The second qualification timer circuit includes a first input coupled to the output of the first qualification timer circuit, and a second input coupled an output of the idle ringing detector circuit. The flip-flop includes a first input coupled to the output of the comparator, and a second input coupled to an output of the second qualification timer circuit.

20 Claims, 5 Drawing Sheets

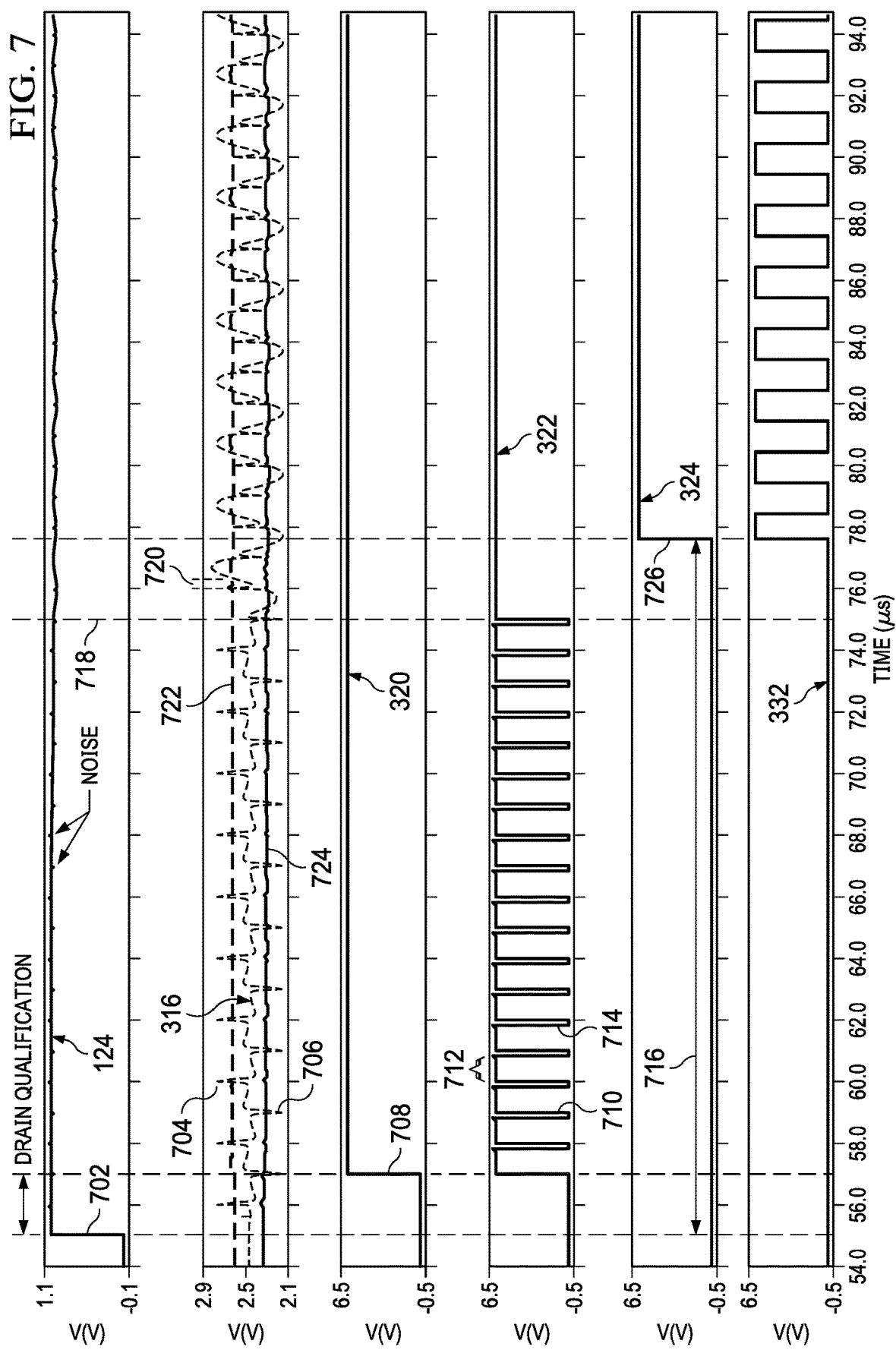

US 10,673,322 B1

POWER FACTOR CORRECTION ZERO CURRENT DETECTION

CROSS-REFERENCE TO RELATED APPLICATIONS

The present application claims priority to U.S. Provisional Patent Application No. 62/793,627, filed Jan. 17, 2019, entitled "Zero-Current Detection with Noise Rejection for PFC Switching Converter," which is hereby incorporated herein by reference in its entirety.

BACKGROUND

Electrical power supplies commonly use diode rectifier circuits to convert from alternating current (AC) to direct current (DC), A diode rectifier conducts current only when the input voltage of the rectifier exceeds the output voltage of the rectifier, so a sinusoidal input voltage results in intermittent non-sinusoidal current flow. The intermittent current flow has a primary frequency component equal to the AC input frequency and substantial energy at integer multiples of the AC input frequency (harmonics). Input current harmonics can cause transient current flow in the AC mains, which can increase the power required from the AC mains and can cause heating of the distribution system. In addition, input current harmonics create electrical noise that can interfere with other systems connected to the AC mains.

The power factor of a power supply is the ratio of the real power delivered to a load divided by the apparent input power, where the apparent input power is the Root-Mean-Square (RMS) input voltage times RMS input current. In general, input current harmonics cause the RMS value of the input current to be substantially higher than the current delivered to the load. Many power supplies include power factor correction to reduce input current harmonics. Power factor correction refers to a process to offset or improve the undesirable effects of non-linear electric loads that contribute to a power factor that is less than unity. These effects involve the phase angle between the voltage and the harmonic content of the current. When the voltage and current are in phase, the power factor is unity, but when the voltage and current are not in phase the power factor is some value less than one.

SUMMARY

A power factor correction (PFC) circuit and switch-mode power supply that distinguish between noise and idle ringing in the drain voltage of a PFC power transistor to detect zero current in the PFC inductor are disclosed herein. In one example, a PFC controller zero current detection circuit includes a differentiator circuit, a comparator, a first qualification timer circuit, an idle ringing detector circuit, a second qualification timer circuit, and a flip-flop. The comparator is coupled to the differentiator circuit. The first qualification timer circuit includes an input coupled to an output of the comparator. The idle ringing detector circuit includes a first input coupled to the output of the comparator, and a second input coupled to an output of the first qualification timer circuit. The second qualification timer circuit includes a first input coupled to the output of the first qualification timer circuit, and a second input coupled an output of the idle ringing detector circuit. The flip-flop includes a first input coupled to the output of the comparator, and a second input coupled to an output of the second qualification timer circuit.

In another example, a PFC controller zero current detection circuit includes a differentiator circuit, a window comparator, and a ringing qualification circuit. The differentiator circuit is configured to detect a change in a rate of change of drain voltage of a PFC circuit. The window comparator is coupled to the differentiator circuit, and is configured to detect a rate of change that is outside a predetermined range. The ringing qualification circuit is coupled to the window comparator, and is configured to distinguish power supply noise on the drain voltage from idle ringing on the drain voltage, and to trigger detection of zero current in an inductor of the PFC circuit based on identification of idle ringing on the drain voltage.

In a further example, a switch-mode power supply includes a rectifier circuit, a PFC circuit, and a DC/DC converter. The PFC circuit is coupled to the rectifier circuit, and includes a differentiator circuit, a first comparator, a second comparator, a first qualification timer circuit, an idle ringing detector circuit, a second qualification timer circuit, and a flip-flop. The first comparator is coupled to the differentiator circuit. The second comparator coupled to the differentiator circuit. The first qualification timer circuit includes a first input coupled to an output of the first comparator, and a second input coupled to an output of the second comparator. The idle ringing detector circuit includes a first input coupled to the output of the first comparator, a second input coupled to the output of the second comparator, and a third input coupled to an output of the first qualification timer circuit. The second qualification timer circuit includes a first input coupled to the output of the first qualification timer circuit, and a second input coupled an output of the idle ringing detector circuit. The flip-flop includes a first input coupled to the output of the first comparator, and a second input coupled to an output of the second qualification timer circuit and the output of the second comparator. The DC/DC converter is coupled to the PFC circuit.

BRIEF DESCRIPTION OF THE DRAWINGS

For a detailed description of various examples, reference will now be made to the accompanying drawings in which:

FIG. 7 shows signals generated by the PFC controller zero current detection circuit of FIG. 3.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

Power factor correction (PFC) based on valley switching offers a number of advantages. For example, use of valley switching in PFC can improve operating efficiency and reduce electro-magnetic interference. However, use of valley switching presents a variety of issues. In some PFC controllers, valley detection uses an auxiliary winding which increases system cost. Other PFC controllers, implement valley detection without inclusion of an auxiliary winding. Such implementations reduce the cost and complexity of PFC circuitry.

Figure 1:
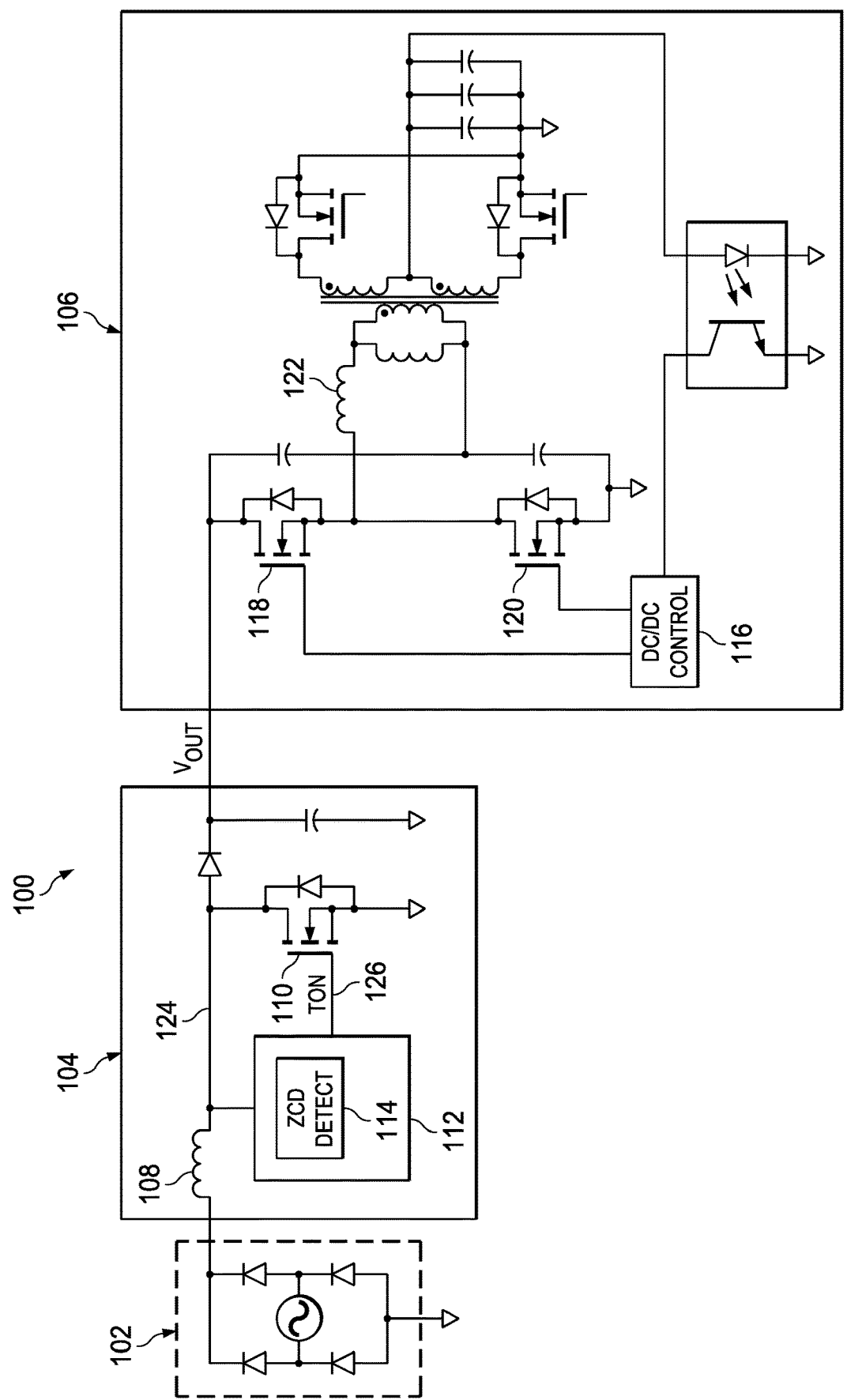
FIG. 1 shows a schematic diagram for switch-mode power supply that includes power factor correction (PFC)

FIG. 1 shows a schematic diagram for a switch-mode power supply 100 that includes power factor correction (PFC). The switch-mode power supply 100 includes a rectifier circuit 102, a PFC circuit 104, and a DC/DC converter 106. The rectifier circuit 102 may be a full-wave rectifier arranged as a diode bridge to convert an alternating current (AC) input voltage into a direct current (DC) output voltage. The rectifier circuit 102 is coupled to the PFC circuit 104.

The PFC circuit 104 includes an inductor 108, a power transistor 110, and a PFC controller 112. The PFC controller 112 controls the power transistor 110 using pulse-width-modulation or another modulation technique to control the DC output voltage VOUT and to generate a continuous sinusoidal input current in phase with the AC input voltage. The power transistor 110 may be a metal oxide semiconductor field effect transistor (MOSFET). The PFC controller 112 may operate in transition mode, discontinuous current mode, and/or burst mode. The output voltage VOUT is provided to the DC/DC converter 106, which is coupled to the PFC circuit 104.

The DC/DC converter 106 is illustrated in FIG. 1 as an inductor-inductor-capacitor (LLC) resonant converter. Some implementations of the of the switch-mode power supply 100 may include a different type of DC/DC converter (e.g., a flyback converter). In the DC/DC converter 106, the DC/DC converter controller 116 controls switching of the transistor 118 and the transistor 120 to charge and discharge the inductor 122.

The PFC controller 112 includes zero current detection circuitry 114. The zero current detection circuitry 114 detects when the current flowing in the inductor 108 falls to zero. The zero current detection circuitry 114 may detect that the current flowing in the inductor 108 has fallen to zero by monitoring the voltage at the drain terminal of the power transistor 110, and identifying a negative slope in the voltage at the drain terminal after the power transistor 110 has been turned off. Some implementations of the zero current detection circuitry 114 use the second order derivative of the drain voltage 124 to detect zero current. That is, the zero current detection circuitry 114 uses the second order derivative of the drain voltage 124 to detect when the idle ringing starts (i.e., when demagnetization of the inductor 108 is complete), by detecting a change in the slope of the drain voltage 124. After the zero current detection circuitry 114 determines that current flowing in the inductor 108 has fallen to zero, the PFC controller 112 may initiate detection of valleys in the voltage at the drain terminal (the drain voltage 124) of the power transistor 110.

The PFC controller 112 may identify valleys (minima in the voltage of resonant ringing) in the voltage on the drain terminal and activate the power transistor 110 during the valley. A valley may correspond to a time of minimum energy storage in the drain node capacitance of the power transistor 110, and activation of the power transistor 110 during a valley improves the efficiency of the PFC circuit 104 by reducing switching losses in the power transistor 110.

In the switch-mode power supply 100, noise generated by switching of the transistor 118 and the transistor 120 in the DC/DC converter 106 may be coupled onto the drain voltage 124 of the power transistor 110. Changes in the drain voltage 124 caused by switching in the DC/DC converter 106 may be identified by the zero current detection circuitry 114 as zero current in the inductor 108. Consequently, the PFC controller 112 may turn on the power transistor 110 while current is flowing in the inductor 108, thereby causing the PFC circuit 104 to operate in continuous conduction mode, which results in poor power factor, poor total harmonic distortion, and an increase in audible noise.

Figure 2:
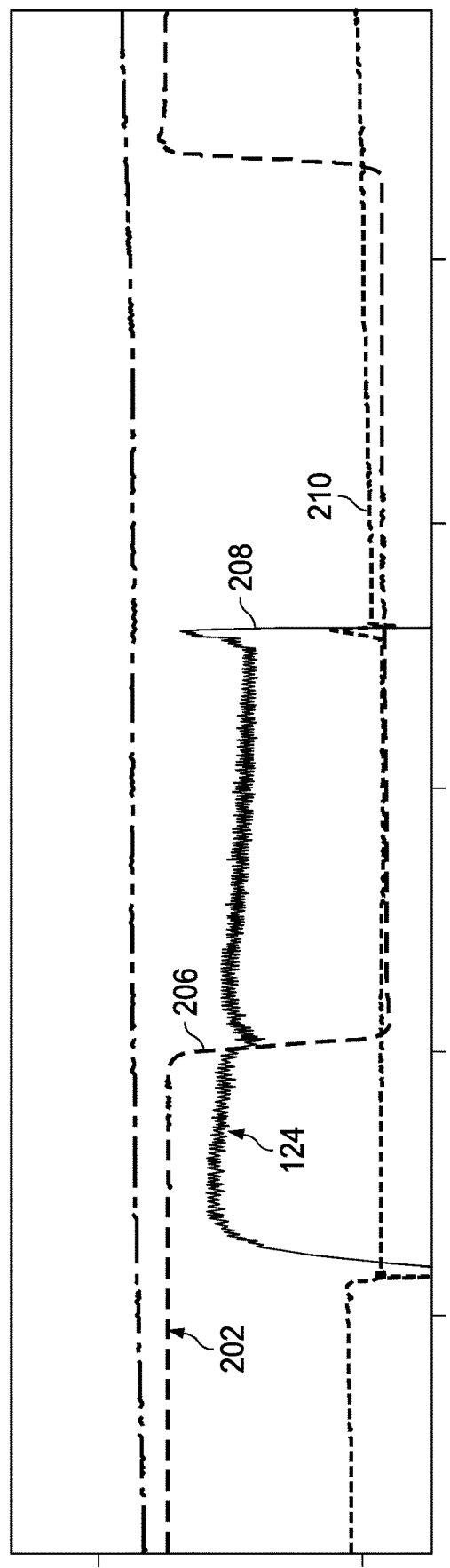
FIG. 2 shows false detection of zero current in a PFC circuit caused by DC/DC converter noise generated in a switch mode power supply.

FIG. 2 shows false detection of zero current in a PFC circuit caused by DC/DC converter noise generated in a switch mode power supply. In FIG. 2, switching in the DC/DC converter 106 (illustrated as switching signal 202) at time 206 causes a change in the drain voltage 124. The zero current detection circuitry 114 identifies the change in the drain voltage 124 at time 206 as zero current in the inductor 108. In turn, the PFC controller 112 turns on the power transistor 110 at time 208 while current 210 is still flowing in the inductor 108. Because current 210 is flowing in the inductor 108 when the power transistor 110 is turned on, the PFC circuit 104 is operating in continuous conduction mode, which is undesirable.

Figure 3:
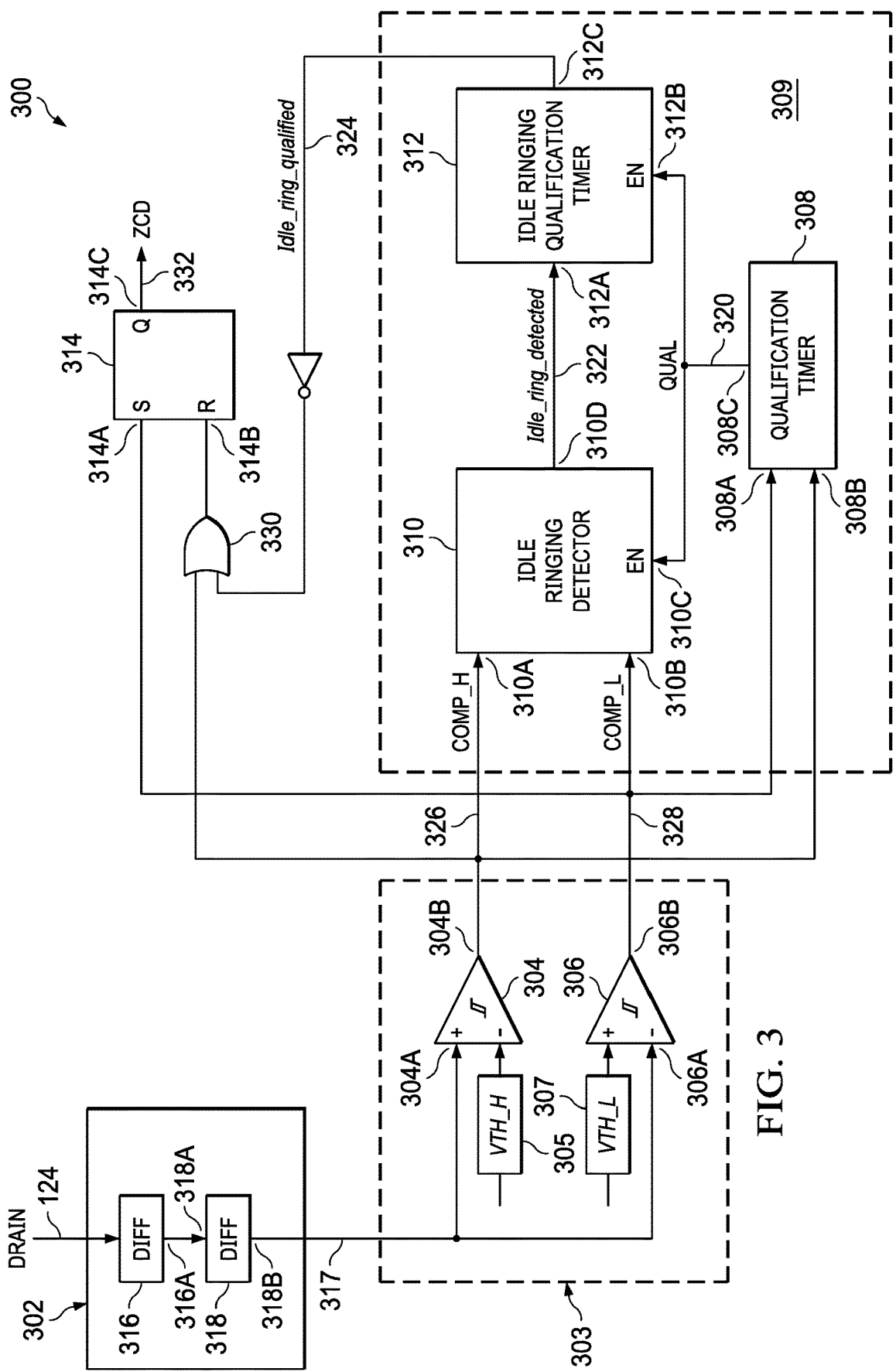
FIG. 3 shows a block diagram for a PFC controller zero current detection circuit that distinguishes idle ringing from noise.

FIG. 3 shows a block diagram for a PFC controller zero current detection circuit 300 that distinguishes idle ringing on the drain voltage 124 from noise on the drain voltage 124 to ensure that the power transistor 110 is not turned as a result of noise from the DC/DC converter 106 coupled onto the drain voltage 124 of the power transistor 110. The PFC controller zero current detection circuit 300 includes a differentiator circuit 302, a window comparator 303, a ringing qualification circuit 309, and a flip-flop 314. The window comparator 303 is coupled to the differentiator circuit 302. The ringing qualification circuit 309 is coupled to the window comparator 303. The flip-flop 314 is coupled to the ringing qualification circuit 309.

The differentiator circuit 302 is coupled to the drain terminal of the power transistor 110, and generates the second order derivative of the drain voltage 124 to detect a change in a rate of change of the drain voltage 124. The differentiator circuit 302 includes a differentiator 316 and a differentiator 318. An input of the differentiator 316 is coupled to the drain terminal of the power transistor 110. An input 318A of the differentiator 318 is coupled to an output 316A of the differentiator 316.

The window comparator 303 includes a comparator 304, a comparator 306, a threshold voltage circuit 305, and a threshold voltage circuit 307. The threshold voltage circuit 305 is coupled to the comparator 304, and the threshold voltage circuit 307 is coupled to the comparator 306. An input 304A of the comparator 304, and an input 306A of the comparator 306 are coupled to an output 318B of the differentiator 318. The comparator 304 compares the derivative 317 (the second order derivative) of the drain voltage 124 generated by the differentiator circuit 302 to the threshold voltage generated by the threshold voltage circuit 305, and the comparator 306 compares the derivative 317 to the threshold voltage generated by the threshold voltage circuit 307 to determine when the rate of change of the drain voltage 124 is outside of the predetermined range defined by the threshold voltages. An output signal 326 of the comparator 304 is active when the derivative 317 is greater than the threshold voltage generated by the threshold voltage circuit 305, and an output signal 328 of the comparator 306 is active when the derivative 317 is less than the threshold voltage generated by the threshold voltage circuit 307.

The ringing qualification circuit 309 distinguishes noise coupled onto the drain voltage 124 from the DC/DC converter 106 from idle ringing, and triggers detection of zero current in the inductor 108 based on identification of idle ringing on the drain voltage 124. The ringing qualification circuit 309 includes a qualification timer circuit 308, an idle ringing detector circuit 310, and an idle ringing qualification timer circuit 312. The qualification timer circuit 308 provides a first qualification of changes on the drain voltage 124 by determining whether changes in the rate of change of the drain voltage 124 occur at a frequency that is higher than a predetermined noise frequency. For example, the switching noise generated by the DC/DC converter 106 is expected to occur at a lower frequency that the idle ringing present on the drain voltage 124 when the inductor 108 is discharged. In some implementations of the qualification timer circuit 308, the predetermined frequency is approximately 500 kilohertz (KHz), and the qualification timer circuit 308 determines whether signal present on the drain voltage 124 has a frequency that is higher or lower than 500 KHz. If the frequency of the signal is lower than 500 KHz, then the qualification timer circuit 308 activates the QUAL signal 320 to enable operation of the idle ringing detector circuit 310 and the idle ringing qualification timer circuit 312. If the frequency of the signal is higher than 500 KHz, then the qualification timer circuit 308 deactivates the QUAL signal 320 to disable operation of the idle ringing detector circuit 310 and the idle ringing qualification timer circuit 312. The qualification timer circuit 308 includes an input 308A coupled to the comparator 306 and an input 308B coupled to the comparator 304.

Figure 4:
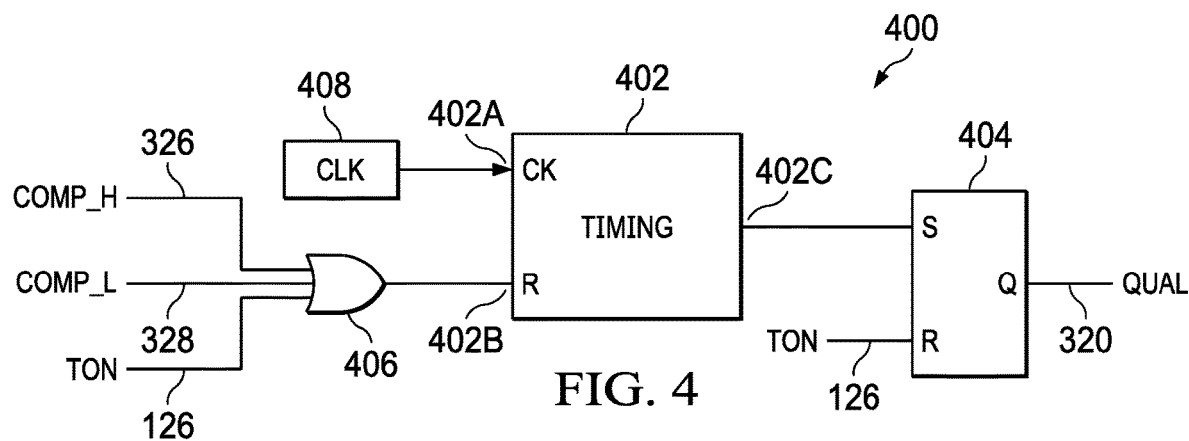
FIG. 4 shows a block diagram for a qualification timer circuit suitable for use in the PFC controller zero current detection circuit of FIG. 3.

FIG. 4 shows a block diagram for a qualification timer circuit 400 suitable for use in the PFC controller zero current detection circuit 300. The qualification timer circuit 400 is an implementation of the qualification timer circuit 308. The qualification timer circuit 400 includes a timing circuit 402, a flip-flop 404, an OR gate 406, and a clock generation circuit 408. The timing circuit 402 is implemented as a digital counter in FIG. 4, but may be implemented as an analog timer in some examples of the qualification timer circuit 400. The timing circuit 402 includes an input 402A coupled to the clock generation circuit 408, an input 402B coupled to the OR gate 406, and an output 402C coupled to the flip-flop 404. The OR gate 406 combines the output signal of the comparator 304, the output signal of the comparator 306, and transistor control signal 126 to reset the timing circuit 402. When not reset, the timing circuit 402 is incremented by the clock signal generated by the clock generation circuit 408. When the power transistor 110 is turned off, and the transistor control signal 126 is inactive, the output signals of the comparators 304 and comparator 306 alternately reset the timing circuit 402. If the time between resets of the timing circuit 402 is sufficient to allow the timing circuit 402 to count to a predetermined value, then the 402C of the timing circuit 402 is activated to set the flip-flop 404, which in turn activates the QUAL signal 320. If, between resets of the timing circuit 402, there is insufficient time for the timing circuit 402 to count to the predetermined value, the QUAL signal 320 remains inactive. For example, if the frequency of signal on the drain voltage 124 should be lower than 500 KHz, and the output 402C of the timing circuit 402 is activated if the timing circuit 402 is able to count to a value equivalent to one microsecond (one-half cycle of 500 KHz) before being reset, then the output 402C will be activated to indicate that the signal frequency is in the desired range.

As noted above, the timing circuit 402 may be implemented as an analog timer. An analog timer may include a capacitor that is charged at a selected rate, and a comparator to compare voltage across the capacitor to a threshold. A switch may be provided across the capacitor to reset the timer.

Returning to FIG. 3, the idle ringing detector circuit 310 determines whether output of the window comparator 303 is indicative of idle ringing on the drain voltage 124 based on time that the rate of change is within the predetermined range defined by the threshold voltages generated by the threshold voltage circuit 305 and the threshold voltage circuit 307. For example, the idle ringing detector circuit 310 measures the time that the derivative 317 is lower than the threshold voltage generated by the threshold voltage circuit 305 and higher than the threshold voltage generated by the threshold voltage circuit 307. If the derivative 317 is between the threshold voltages for more than a predetermined time, then noise is present on the drain voltage 124, and the idle ringing detector circuit 310 deactivates the IDLE_RING_DETECTED signal 322. If the derivative 317 is between the threshold voltages for less than the predetermined time, then idle ringing is present on the drain voltage 124 and the idle ringing detector circuit 310 does not reset the IDLE_RING_DETECTED signal 322. The idle ringing detector circuit 310 includes an input 310A coupled to output 304B of the comparator 304, an input 310B coupled to output 306B of the comparator 306, an input 310C coupled to output 308C of the qualification timer circuit 308, and an output 310D coupled to input 312A of the idle ringing qualification timer circuit 312.

Figure 5:
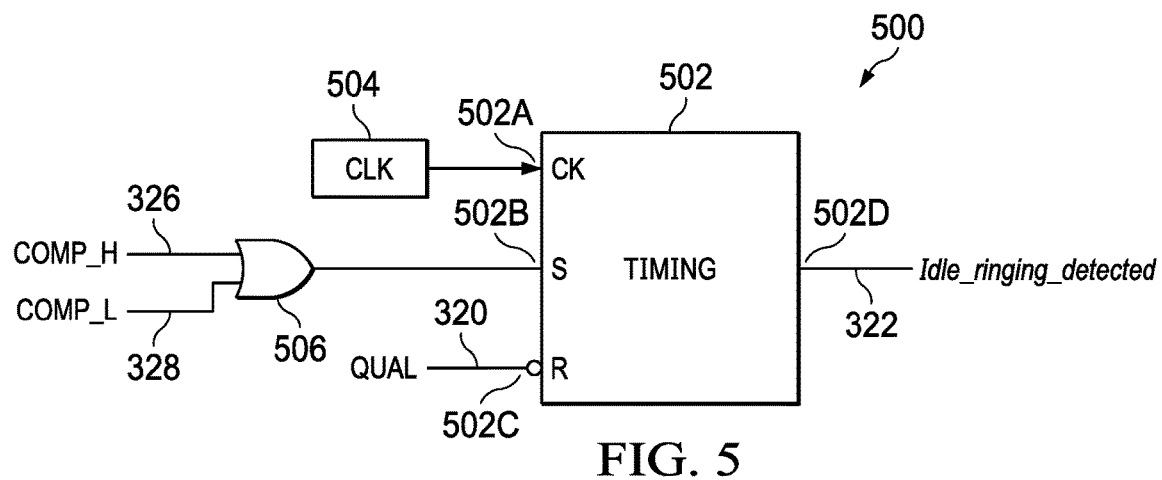
FIG. 5 shows a block diagram for an idle ringing detector circuit suitable for use in the PFC controller zero current detection circuit of FIG. 3.

FIG. 5 shows a block diagram for an idle ringing detector circuit 500 suitable for use in the PFC controller zero current detection circuit 300. The idle ringing detector circuit 500 is an implementation of the idle ringing detector circuit 310. The idle ringing detector circuit 500 includes a timing circuit 502, a clock generator circuit 504, and an OR gate 506. The timing circuit 502 is implemented as a digital counter in FIG. 5, but may be implemented as an analog timer in some examples of the idle ringing detector circuit 500. The timing circuit 502 includes an input 502A coupled to the clock generator circuit 504, an input 502B coupled to the OR gate 506, an input 502C coupled to the output 308C of the qualification timer circuit 308, and an output 502D. When the QUAL signal 320 is inactive, the timing circuit 502 is reset, deactivating the IDLE_RING_DETECTED signal 322. When the QUAL signal 320 is active, the timing circuit 502 is enabled to count. When the timing circuit 502 is enabled, and while either of the comparator output signals 326 or 328 is active, the timing circuit 502 is set, activating the IDLE_RING_DETECTED signal 322 (indicating that idle ringing may be present on the drain voltage 124). If during the time that neither of the comparator output signals 326 or 328 is active, the timing circuit 502 has sufficient time to count to a predetermined value, the output 502D is reset, which deactivates the IDLE_RING_DETECTED signal 322 (indicating that noise rather than idle ringing is present on the drain voltage 124).

As noted above, the timing circuit 502 may be implemented as an analog timer. An analog timer may include a capacitor that is charged at a selected rate, and a comparator to compare voltage across the capacitor to a threshold. A switch may be provided across the capacitor to reset the timer. A switch may also be provided to set the voltage across the capacitor to a selected voltage.

Returning again to FIG. 3, the idle ringing qualification timer circuit 312 measures the time that the IDLE_RING-_DETECTED signal 322 is continuously active and sets an IDLE_RINGING_QUALIFIED flag 324 based on detection of idle ringing on the drain voltage for at least a predetermined time. For example, if the IDLE_RING_DETECTED signal 322 is active for 2.5 microseconds or more, then the idle ringing qualification timer circuit 312 may set the IDLE_RINGING_QUALIFIED flag 324 to indicate that idle ringing has been detected. The idle ringing qualification timer circuit 312 includes an input 312A coupled to output 310D of the idle ringing detector circuit 310, an input 312B coupled to output 308C of the qualification timer circuit 308, and an output 312C coupled to input 314B of the flip-flop 314.

Figure 6:
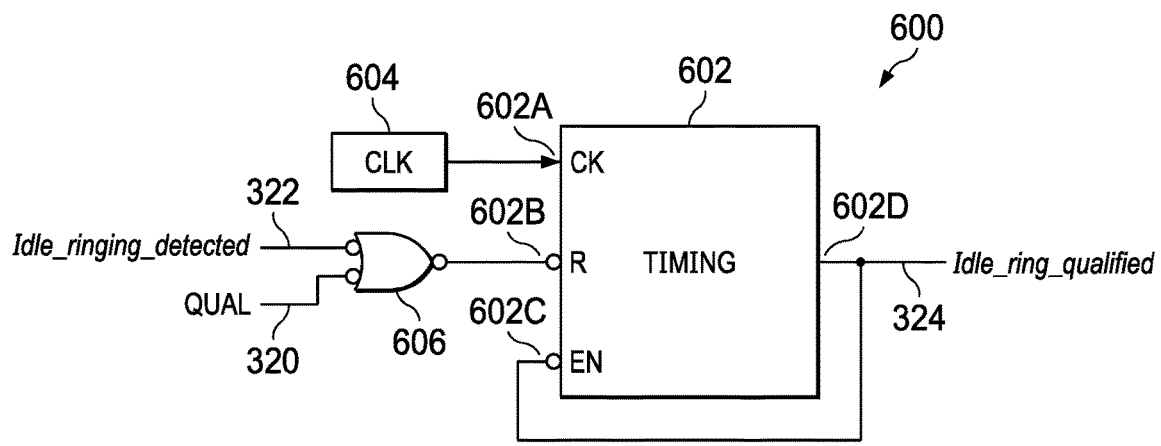
FIG. 6 shows a block diagram for an idle ringing qualification timer circuit suitable for use in the PFC controller zero current detection circuit of FIG. 3.

FIG. 6 shows a block diagram for an idle ringing qualification timer circuit 600 suitable for use in the PFC controller zero current detection circuit 300. The idle ringing qualification timer circuit 600 is an implementation of the idle ringing qualification timer circuit 312. The idle ringing qualification timer circuit 600 includes a timing circuit 602, a clock generator circuit 604, and a OR gate 606. The timing circuit 602 is implemented as a digital counter in FIG. 6, but may be implemented as an analog timer in some examples of the idle ringing qualification timer circuit 600. The timing circuit 602 includes an input 602A coupled to the clock generator circuit 604, an input 602B coupled to the OR gate 606, an output 602D, and an input 602C coupled to the output 602D. The output 602D is coupled to the flip-flop 314. The timing circuit 602 is reset when either of the QUAL signal 320 or the IDLE_RING_DETECTED signal 322 is inactive. Accordingly, the IDLE_RINGING_QUALIFIED flag 324 is inactive when either of the QUAL signal 320 or the IDLE_RING_DETECTED signal 322 is inactive. When the IDLE_RINGING_QUALIFIED flag 324 is inactive, the timing circuit 602 is enabled to count when not reset. Thus, when both the QUAL signal 320 and the IDLE_RING_DETECTED signal 322 have transitioned from inactive to active, the timing circuit 602 counts, and when the QUAL signal 320 and the IDLE_RING_DETECTED signal 322 remain active for a predetermined time the IDLE_RINGING_QUALIFIED flag 324 is activated, which disables further counting of the timing circuit 602.

As noted above, the timing circuit 602 may be implemented as an analog timer. An analog timer may include a capacitor that is charged at a selected rate, and a comparator to compare voltage across the capacitor to a threshold. A switch may be provided across the capacitor to reset the timer.

Returning once again to FIG. 3, the flip-flop 314 includes an input 314A coupled to the output 306B of the comparator 306, and an input 314B coupled to the output 312C of the idle ringing qualification timer circuit 312 and the 304B of the comparator 304 via the OR gate 330, and an output 314C. The ZERO CURRENT DETECTED (ZCD) signal 332 is provided at the output 314C. The ZCD signal 332 indicates that zero current is flowing in the inductor 108. The ZCD signal 332 is activated when the IDLE_RINGING_QUALIFIED flag 324 indicates that idle ringing is present on the drain voltage 124 and the output signal 328 generated by the comparator 306 is active. The output 314C is coupled to the gate terminal of the power transistor 110.

FIG. 7 shows signals generated by the PFC controller zero current detection circuit 300. In FIG. 7, the drain voltage 124 rises from ground to VOUT at time 702, when the power transistor 110 is turned off. Switching noise from the DC/DC converter 106 is coupled onto the drain voltage 124. The differentiator circuit 302 differentiates the drain voltage 124 to produce the derivative 317, which includes pulses 704 and 706 corresponding to change in the drain voltage 124 caused by the switching. The comparator 304 converts the 704 into pulses of the output signal 326, and the comparator 306 converts the 706 into pulses on the output signal 328.

Turning off the power transistor 110 enables the timing circuit 402 to measure the time between a pulse 704 and a pulse 706. The time between the pulse 704 and the pulse 706 is sufficient to activate the signal at the output 402C of the timing circuit 402 and set the flip-flop 404, which activates the QUAL signal 320 at time 708. Activation of the QUAL signal 320 enables the timing circuit 502 to measure the time between the pulse 704 and the pulse 706. At time 710, the timing circuit 502 is set by the pulse 704, which activates the IDLE_RING_DETECTED signal 322, and the timing circuit 502 is counting in the interval 712. The time between the pulse 704 and the pulse 706 is relatively long and the timing circuit 502 counts to a value that resets the IDLE_RING_DETECTED signal 322 at time 714, which indicates that noise rather than idle ringing is present on the drain voltage 124. Because of the detected noise, the IDLE_RINGING_QUALIFIED flag 324 remains inactive in the interval 716.

At time 718, the inductor 108 is discharged and idle ringing appears on the drain voltage 124. During the idle ringing the interval 720, time during which the derivative 317 is between the threshold voltages 722 and 724 (e.g., outputs of the threshold voltage circuits 305 and 307) is relatively short. As a result, the timing circuit 502 is unable to count to a value that resets the IDLE_RING_DETECTED signal 322 in the interval 720, and after time 718 the IDLE_RING_DETECTED signal 322 remains active, which allows the timing circuit 602 to count to a predetermined value and activate the IDLE_RINGING_QUALIFIED flag 324 at time 726. With activation of the IDLE_RINGING_QUALIFIED flag 324, the flip-flop 314 is set to activate the ZCD signal 332 indicating that zero current in the inductor 108 has been detected.

Modifications are possible in the described embodiments, and other embodiments are possible, within the scope of the claims.

What is claimed is:

1. A power factor correction (PFC) controller zero current detection circuit, comprising:
   a differentiator circuit;
   a comparator coupled to the differentiator circuit;
   a first qualification timer circuit comprising an input coupled to an output of the comparator;
   an idle ringing detector circuit comprising:
      a first input coupled to the output of the comparator; and
      a second input coupled to an output of the first qualification timer circuit;
   a second qualification timer circuit comprising:
      a first input coupled to the output of the first qualification timer circuit; and
      a second input coupled an output of the idle ringing detector circuit; and
   a flip-flop comprising:
      a first input coupled to the output of the comparator; and
      a second input coupled to an output of the second qualification timer circuit.

2. The PFC controller zero current detection circuit of claim 1, wherein:
the comparator is a first comparator;
the input of the first qualification timer circuit is a first input; and
the PFC controller zero current detection circuit comprises a second comparator comprising:
an input coupled to the differentiator circuit; and
an output coupled to a second input of the first qualification timer circuit, a third input of the idle ringing detector circuit, and the second input of the flip-flop.

3. The PFC controller zero current detection circuit of claim 2, wherein the idle ringing detector circuit comprises a timing circuit comprising:
a first input coupled to the output of the first qualification timer circuit;
a second input coupled to the output of the first comparator and the output of the second comparator;
a third input coupled to a clock generator circuit; and
an output coupled to the second input of the second qualification timer circuit.

4. The PFC controller zero current detection circuit of claim 2, further comprising:
a first threshold voltage circuit coupled to the first comparator; and
a second threshold voltage circuit coupled to the second comparator.

5. The PFC controller zero current detection circuit of claim 2, wherein the differentiator circuit comprises:
a first differentiator;
a second differentiator comprising:
an input coupled to an output of the first differentiator; and
an output coupled to the first comparator and the second comparator.

6. The PFC controller zero current detection circuit of claim 1, wherein the first qualification timer circuit comprises a timing circuit comprising:
a first input coupled to the output of the comparator;
a second input coupled to a clock generator circuit; and
an output coupled to the second input of the idle ringing detector circuit and the first input of the second qualification timer circuit.

7. The PFC controller zero current detection circuit of claim 1, wherein the second qualification timer circuit comprises a timing circuit comprising:
a first input coupled to the output of the first qualification timer circuit;
a second input coupled to the output of the idle ringing detector circuit;
a third input coupled to a clock generator circuit; and
an output coupled to the second input of the flip-flop.

8. A power factor correction (PFC) controller zero current detection circuit, comprising: a differentiator circuit configured to detect a rate of change of drain voltage of a PFC circuit; a window comparator coupled to the differentiator circuit, and configured to detect the rate of change being outside a predetermined range; and a ringing qualification circuit coupled to the window comparator; and configured to: distinguish power supply noise on the drain voltage from de ringing on the drain voltage; and trigger detection of zero current in an inductor of the PFC circuit based on identification of the idle ringing on the drain voltage.

9. The PFC controller zero current detection circuit of claim 8, wherein the ringing qualification circuit comprises:
a first qualification timer circuit coupled to the window comparator;
an idle ringing detector circuit coupled to the window comparator and the first qualification timer circuit; and
a second qualification timer circuit coupled to the idle ringing detector circuit and the first qualification timer circuit.

10. The PFC controller zero current detection circuit of claim 9, wherein the first qualification timer circuit is configured to:
determine whether changes in the rate of change occur at a frequency that is lower than a predetermined noise frequency; and
enable the idle ringing detector circuit and the second qualification timer circuit to detect the idle ringing based on the changes in the rate of change occurring at a frequency that is lower than the predetermined noise frequency.

11. The PFC controller zero current detection circuit of claim 9, wherein the idle ringing detector circuit is configured to determine whether output of the window comparator is indicative of the idle ringing on the drain voltage based on time that the rate of change is within the predetermined range.

12. The PFC controller zero current detection circuit of claim 9, wherein the second qualification timer circuit is configured to set an idle ringing qualified flag based on detection of the idle ringing on the drain voltage for at least a predetermined time.

13. The PFC controller zero current detection circuit of claim 12, further comprising a flip-flop coupled to the second qualification timer circuit and the window comparator, and configured to activate a zero current detected signal based on the idle ringing qualified flag being set and the rate of change being outside the predetermined range.

14. The PFC controller zero current detection circuit of claim 8, wherein the window comparator comprises:
a first comparator configured to compare an output signal of the differentiator circuit to a first threshold voltage; and
a second comparator configured to compare the output signal of the differentiator circuit to a second threshold voltage.

15. The PFC controller zero current detection circuit of claim 8, wherein the differentiator circuit is configured to generate a second order derivative of the drain voltage.

16. A switch-mode power supply, comprising: a rectifier circuit; a power factor correction (PFC) circuit coupled to the rectifier circuit, and comprising: a differentiator circuit; a first comparator coupled to the differentiator circuit; a second comparator coupled to the differentiator circuit; a first qualification timer circuit comprising: a first input coupled to an output of the first comparator; and a second input coupled to an output of the second comparator; an idle ringing detector circuit comprising: a first input coupled to the output of the first comparator; a second input coupled to the output of the second comparator; and a third input coupled to an output of the first qualification timer circuit; a second qualification timer circuit comprising: a first input coupled to the output of the first qualification timer circuit; and a second input coupled an output of the idle ringing detector circuit; and a flip-flop comprising: a first input coupled to the output of the first comparator; and a second input coupled to an output of the second qualification timer circuit and the output of the second comparator; and a DC/DC converter coupled to the PFC circuit.

17. The switch-mode power supply of claim 16, wherein the PFC circuit comprises a power transistor comprising:
a first terminal coupled to the differentiator circuit; and a second terminal coupled to an output of the flip-flop.

18. The switch-mode power supply of claim 16, wherein the first qualification timer circuit comprises a timing circuit comprising: a first input coupled to the output of the first comparator and the output of the second comparator: a second input coupled to a clock generator circuit; and an output coupled to the third input of the idle ringing detector circuit and the first input of the second qualification timer circuit.

19. The switch-mode power supply of claim 16, wherein the idle ringing detector circuit comprises a timing circuit comprising:
   a first input coupled to the output of the first qualification timer circuit;
   a second input coupled to the output of the first comparator and the output of the second comparator;
   a third input coupled to a clock generator circuit; and
   an output coupled to the second input of the second qualification timer circuit.

20. The switch-mode power supply of claim 16, wherein the second qualification timer circuit comprises a timing circuit comprising:
   a first input coupled to the output of the first qualification timer circuit;
   a second input coupled to the output of the idle ringing detector circuit;
   a third input coupled to a clock generator circuit; and
   an output coupled to the second input of the flip-flop.

* * * * *